US012737488B2

(12) United States Patent
McDonald

(10) Patent No.: US 12,737,488 B2
(45) Date of Patent: Sep. 15, 2026

(54) DISCONNECTED DATABASE DATA STRUCTURE PROTECTION

(71) Applicant: ServiceNow, Inc., Santa Clara, CA (US)

(72) Inventor: Matthew McDonald, Callahan, FL (US)

(73) Assignee: ServiceNow, Inc., Santa Clara, CA (US)

( * ) Notice: Subject to any disclaimer, the term of this patent is extended or adjusted under 35 U.S.C. 154(b) by 139 days.

(21) Appl. No.: 18/383,727

(22) Filed: Oct. 25, 2023

(65) Prior Publication Data

US 2025/0139266 A1 May 1, 2025

(51) Int. Cl.
*G06F 21/62* (2013.01)
*G06F 21/55* (2013.01)

(52) U.S. Cl.
CPC ........ *G06F 21/6218* (2013.01); *G06F 21/552* (2013.01)

(58) Field of Classification Search
None
See application file for complete search history.

(56) References Cited

U.S. PATENT DOCUMENTS 6,959,329 B2 10/2005 Thakor
7,426,512 B1 * 9/2008 Ben-Natan .............. G06F 21/55 707/999.009
8,799,448 B2 8/2014 Yan
10,523,689 B2 12/2019 Decenzo
10,798,165 B2 10/2020 Srinivasan
10,992,746 B2 4/2021 Lucas
11,032,131 B1 6/2021 Franceschetti
2005/0125589 A1 6/2005 Feng
2005/0203892 A1 9/2005 Wesley
2012/0151036 A1 6/2012 Detro
2016/0057211 A1 * 2/2016 Thapliyal ................ H04L 67/02 709/203
2016/0134595 A1 5/2016 Lavinio
2016/0241583 A1 8/2016 Kowalczyk
2017/0364700 A1 12/2017 Goldfarb (Continued)

FOREIGN PATENT DOCUMENTS

CN 115859273 A * 3/2023 ............. G06F 21/55
WO 2021148461 A1 7/2021

OTHER PUBLICATIONS

Tang et al. "Detection of SQL Injection based on Artificial Neural Network", Feb. 20, 2020, Knowledge-Based Systems, vol. 190, https://doi.org/10.1016/j.knosys.2020.105528. (Year: 2020).*

(Continued)

*Primary Examiner* — Philip J Chea
*Assistant Examiner* — Bin Qing Zheng
(74) *Attorney, Agent, or Firm* — McDonnell Boehnen Hulbert & Berghoff LLP

(57) ABSTRACT

Online interaction data between one or more clients and a database server communicating via a network is received. The online interaction data is used to train a data protection machine learning model for detecting a malicious attack. An offline interface for accessing a database data structure is provided, wherein the offline interface is configured to apply the data protection machine learning model trained using the online interaction data to protect the database data structure accessed via the offline interface.

21 Claims, 7 Drawing Sheets

(56) References Cited

U.S. PATENT DOCUMENTS

| | | | | |
|---|---|---|---|---|
| 2018/0026956 | A1 | 1/2018 | Caffary, Jr. | |
| 2018/0357304 | A1 * | 12/2018 | Balasubrahmanian | G06F 16/252 |
| 2019/0166029 | A1 | 5/2019 | Abrams | |
| 2019/0297078 | A1 | 9/2019 | Davis, III | |
| 2020/0097587 | A1 * | 3/2020 | Klein | G06F 16/2462 |
| 2020/0387833 | A1 | 12/2020 | Kursun | |
| 2020/0389532 | A1 * | 12/2020 | Lisac | H04L 67/51 |
| 2020/0404007 | A1 * | 12/2020 | Singh | G06F 16/24537 |
| 2021/0328969 | A1 * | 10/2021 | Gaddam | H04L 63/102 |
| 2022/0012134 | A1 | 1/2022 | Chatterjee | |
| 2022/0156395 | A1 | 5/2022 | Bednash | |
| 2022/0286804 | A1 | 9/2022 | Danducci, II | |

OTHER PUBLICATIONS

Agent-Based Offline Discovery, downloaded from <https://docs.device42.com/auto-discovery/~gent-based-offline-discovery/> on Feb. 26, 2021 (via the Internet Archive).

* cited by examiner

DISCONNECTED DATABASE DATA STRUCTURE PROTECTION

BACKGROUND OF THE INVENTION

A disconnected database data structure corresponds to a representation of a database but is operated in an offline mode. By being operated in an offline mode, the disconnected database data structure cannot be accessible via network operations such as remote queries. Typically, the disconnected database data structure is located on the same computing device as an application client. A local application client can integrate with a disconnected database data structure via a software development kit (SDK) designed for the disconnected database data structure. Queries made to the disconnected database data structure can be initiated via application programming interfaces (APIs) or a similar interface.

BRIEF DESCRIPTION OF THE DRAWINGS

Various embodiments of the invention are disclosed in the following detailed description and the accompanying drawings.

DETAILED DESCRIPTION

Figure 1:
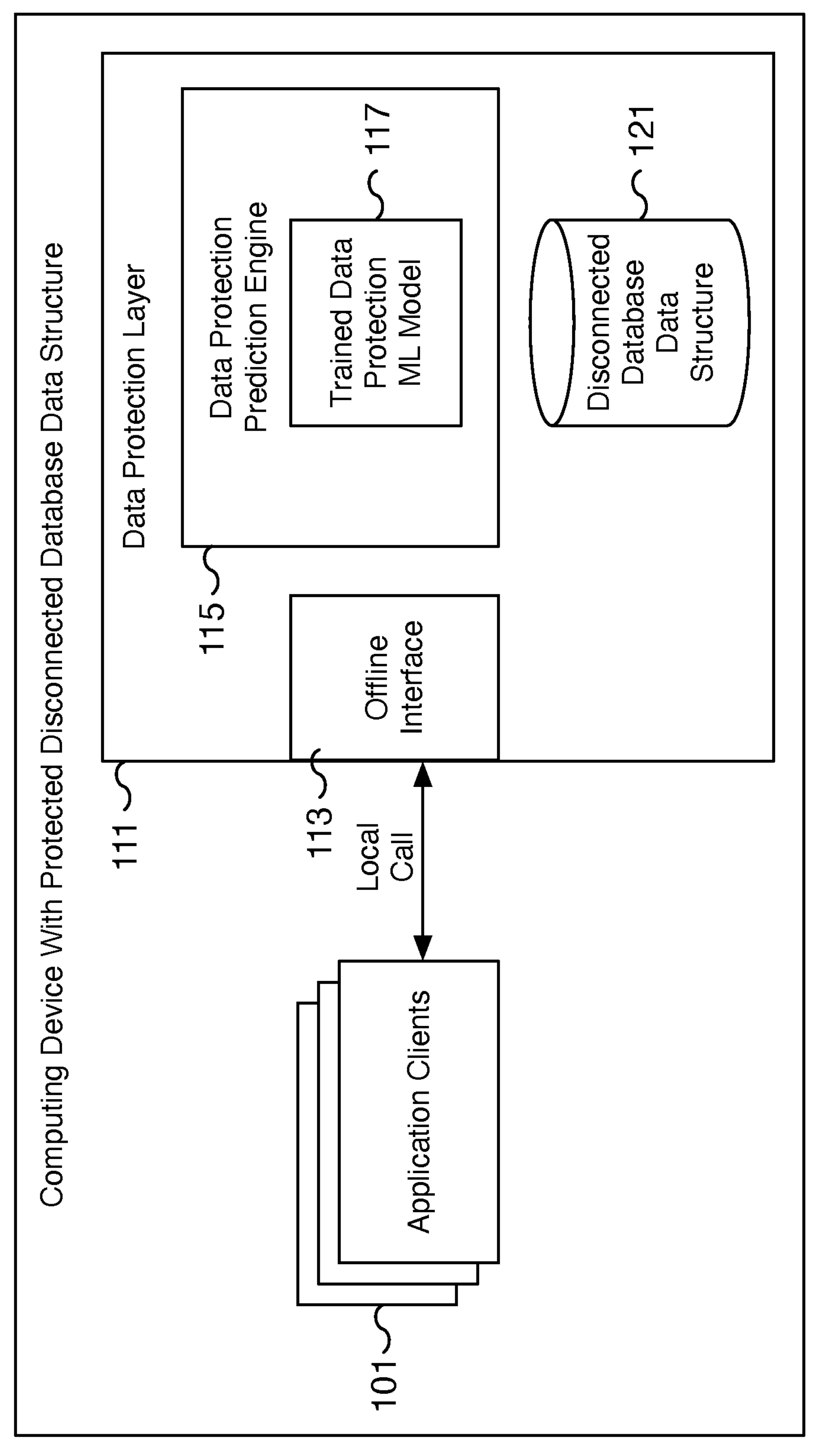
FIG. 1 is a block diagram illustrating an example of a computing device hosting applications with access to a protected disconnected database data structure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Protection against malicious attacks directed at a disconnected database data structure is disclosed. Using the disclosed techniques, a disconnected database data structure accessible via an offline interface is protected against attacks by a software protection layer running a data protection machine learning model. The software protection layer helps to isolate the disconnected database data structure and further monitors calls, such as application programming interface (API) calls, made using the exposed offline interface for access to the disconnected database data structure. The software protection layer includes a data protection machine learning model to differentiate normal traffic accessing the disconnected database data structure from malicious attacks. In various embodiments, the data protection machine learning model is trained on database interactions captured from clients accessing one or more online database systems. The training data captured from live interactions can be further amended such as with interactions from known malicious attacks. By utilizing at least live interaction data for training the data protection machine learning model, the trained data protection machine learning model can anticipate a wide range of malicious attacks made against a disconnected (and offline) database data structure. Non-malicious or routine traffic attempting to access the disconnected database data structure is also identified and is forwarded to the disconnected database data structure with minimal or no interruption. Although the offline mode of the disconnected database data structure adds a perceived initial layer of security, the addition of the trained data protection machine learning model to predict malicious attacks significantly improves the overall security of the disconnected database data structure in particular from compromised application clients.

In some embodiments, online interaction data between one or more clients and a database server communicating via a network is received. For example, one or more application clients are configured to utilize a database server using network queries. The network queries can access, modify, insert, and/or retrieve data from the database server, among performing other database operations. The network queries directed to the database server from the clients are captured as captured online interaction data. In some embodiments, the online interaction data is used to train a data protection machine learning model for detecting a malicious attack. For example, the online interaction data is used to train a machine learning model to predict malicious database attacks. The online interaction data is prepared as training data and can be amended with additional training data such as interaction data corresponding to known malicious attacks. The prepared training data can include interaction data corresponding to different data and database attacks such as structure query language (SQL) injection attacks, denial-of-service (DOS) attacks, data modification attacks, and/or data theft attacks, among others. The features used for training the data protection machine learning model can correspond to the data payload of the network database query, specific SQL statements included in the query payload, properties of the network traffic including traffic patterns of the application clients, properties of the source and/or destination of the queries, and/or configuration changes such as changes in the connectivity between the application client and database server, among others.

In some embodiments, an offline interface for accessing a database data structure is provided, wherein the offline interface is configured to apply the data protection machine learning model trained using the online interaction data to protect the database data structure accessed via the offline interface. For example, a disconnected database data structure is provided with an offline interface for accessing its associated data. The disconnected database data structure resembles a networked database server but lacks network access and is primarily (or only) accessible via the provided offline interface. For example, the disconnected database data structure can respond to queries such as database queries but utilizes the provided offline interface instead of communicating via a network. Unlike a traditional networked-accessible database such as a cloud-based database service, the disconnected database data structure and its data cannot be accessed via network queries. Instead, queries to the disconnected database data structure are made from a local application utilizing the provided offline interface. For example, a local application executing on a same computing device as a disconnected database data structure can integrate with the disconnected database data structure and the offline interface using a software development kit (SDK) of the disconnected database data structure. Queries to the disconnected database data structure can be initiated via an application programming interface (API) to query the data stored locally by the disconnected database data structure. In various embodiments, the disconnected database data structure is protected from malicious attacks by a software protection layer that applies the data protection machine learning model to evaluate incoming queries, such as API calls utilizing the offline interface. Using the trained data protection machine learning model, malicious attacks are detected and blocked from accessing the disconnected database data structure. Non-malicious calls such as routine API calls are forwarded to the disconnected database data structure with minimal or no interruption.

FIG. 1 is a block diagram illustrating an example of a computing device hosting applications with access to a protected disconnected database data structure. In the example shown, computing device 100 is a computing device with an installed protected disconnected database data structure. Computing device 100 is further configured with one or more application clients 101 that can access the data hosted by disconnected database data structure 121. As shown in the example, disconnected database data structure 121 is protected by data protection layer 111. In various embodiments, data protection layer 111 protects disconnected database data structure 121 from malicious attacks while allowing non-malicious access to disconnected database data structure 121 to proceed with minimal or no interruption. Data protection layer 111 includes offline interface 113 for accessing disconnected database data structure 121 and data protection prediction engine 115 to detect malicious attacks. In various embodiments, data protection prediction engine 115 receives data access requests via offline interface 113 and applies trained data protection machine learning model 117 to identify and block malicious calls initiated from applications such as application clients 101.

In some embodiments, computing device 100 is a computing device for hosting application clients 101 that require access to data stored by disconnected database data structure 121. Computing device 100 can be a computer server, a desktop computer, a laptop, a mobile device, a tablet, a kiosk, a voice assistant, a wearable device, or another computing device where access to at least a subset of data is protected by hosting the data in a disconnected/offline state using a disconnected database data structure, i.e., disconnected database data structure 121. Access to the protected data from applications hosted by computer device 100, such applications associated with application clients 101, is made via an offline interface 113 and not via network queries. In various embodiments, computing device 100 may be configured with network access, however, the data of disconnected database data structure 121 is accessible from applications of computing device 100 such as application clients 101 only via offline interface 113.

In some embodiments, application clients 101 are associated with applications running on computing device 100 that are configured to access disconnected database data structure 121. Application clients are configured to conform to the local interface offered by offline interface 113, which may correspond to an application programming interface (API) for making local calls. In some embodiments, a software development kit (SDK) is provided to integrate application clients 101 with disconnected database data structure 121. Unlike network database servers, the queries to disconnected database data structure 121 are all local calls as shown in FIG. 1. Although application clients 101 is shown with multiple clients, in various embodiments, application clients 101 can be a single client or multiple clients as appropriate.

In some embodiments, data protection layer 111 is a protection layer such as a wrapper that protects disconnected database data structure 121 from malicious attacks. For example, access to disconnected database data structure 121 must be approved by data protection layer 111 and data protection layer 111 exists to monitor the access to (and potentially from) disconnected database data structure 121. As shown in FIG. 1, data protection layer 111 includes offline interface 113 and data protection prediction engine 115. In various embodiments, offline interface 113 is a local API or appropriate interface that allows local applications to access disconnected database data structure 121. Access via network queries is not allowed. Instead, incoming local calls via offline interface 113 are processed by data protection prediction engine 115 of data protection layer 111. For example, data protection prediction engine 115 utilizes trained data protection machine learning model 117 to identify and block malicious attacks. Non-malicious calls are allowed to access disconnected database data structure 121. In various embodiments, trained data protection machine learning model 117 is a machine learning model trained using at least online interaction data captured from a network-accessible database. The training data is then used and applied, by data protection prediction engine 115, to the offline interactions used to access disconnected database data structure 121.

In some embodiments, disconnected database data structure 121 is a data structure that is modeled after a traditional database. Queries via offline interface 113 can similarly resemble network queries including by utilizing structure query language (SQL) syntax for queries. Unlike a traditional database, disconnected database data structure 121 is not network connected, removing a potential threat vector related to network attacks. In some embodiments, the data of disconnected database data structure 121 can be synchronized with another database (and vice versa) including a network database. For example, at scheduled intervals, on demand, or based on another trigger and/or event, the data of disconnected database data structure 121 can be synchronized with a second data store (not shown) such as a remote data store including a cloud database service.

Figure 2:
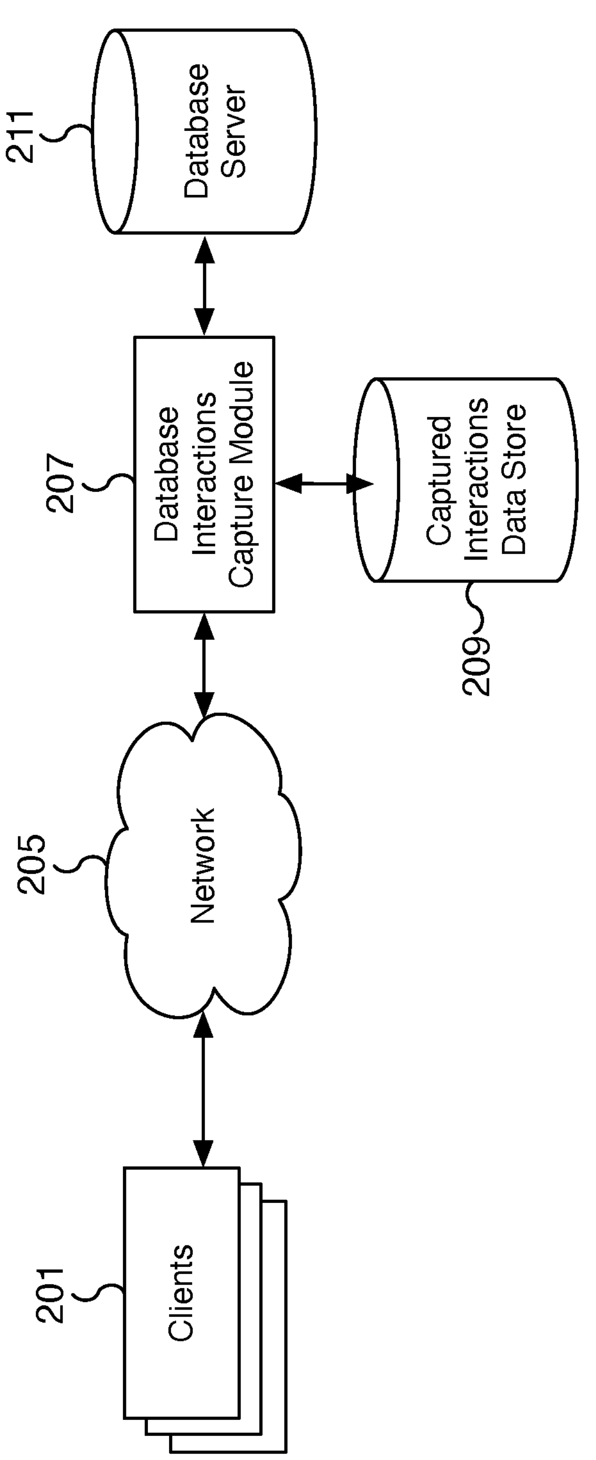
FIG. 2 is a block diagram illustrating an example of a network environment for capturing database interactions directed to a network-accessible database.

FIG. 2 is a block diagram illustrating an example of a network environment for capturing database interactions directed to a network-accessible database. In the example shown, clients 201 are connected to database server 211 via network 205 and database interactions capture module 207. Network 205 can be a public or private network. In some embodiments, network 205 is a public network such as the Internet. In various embodiments, clients 201 are database clients and send network database queries to access data hosted by database server 211. As shown in FIG. 2, database interactions capture module 207 is positioned to monitor incoming traffic to database server 211. The incoming traffic corresponds to online interactions with database server 211 and these online interactions are captured for use as training data. The captured interactions are stored in captured interactions data store 209. In some embodiments, the captured data includes routine database interactions as well as malicious attacks. The captured online interactions data can be used for training a data protection machine learning model to prevent malicious attacks including attacks against a disconnected database data structure. In some embodiments, the configuration shown in FIG. 2 is used to capture training data for training a data protection machine learning model such as trained data protection machine learning model 117 of FIG. 1 to protect a disconnected database data structure such as disconnected database data structure 121 of FIG. 1.

In some embodiments, clients 201 correspond to one or more network computing devices with application clients configured to access a network-accessible database. For example, clients 201 can issue structure query language (SQL) queries, or another form of database query, to access data records from database server 211. In certain scenarios, one or more of clients 201 can include malicious clients that are configured to attack database server 211. For example, malicious database attacks can be issued from one of clients 201 and may include attacks such as SQL injection attacks, denial-of-service (DOS) attacks, data modification attacks, and/or data theft attacks, among others.

In some embodiments, database server 211 is a network-accessible database server. In some embodiments, database server 211 is a data store or other similar data storage, management, and/or retrieval system. Database server 211 can include hardware, software, and network components for storing, managing, and retrieving data. In some embodiments, database server 211 corresponds to a cloud database service. In the example shown, database server 211 is a networked database that can be accessible through network protocols such as TCP/IP and via network queries that are built on top of the supported network protocols.

In some embodiments, database interactions capture module 207 is a network module capable of capturing traffic coming to and from database server 211. The captured data is stored in captured interactions data store 209 and includes online interaction data between clients 201 and database server 211 communicating via network 205. Although database interactions capture module 207 is shown as located between network 205 and database server 211, in various embodiments, database interactions capture module 207 observes the traffic for database server 211 without intercepting and/or interfering with the traffic. For example, database interactions capture module 207 can receive a mirror or duplicate of the traffic for database interactions capture module 207. In various embodiments, database interactions capture module 207 can monitor the ingress and egress traffic for database interactions capture module 207.

In various embodiments, the interactions and their associated data captured by database interactions capture module 207 are not limited to the contents of network payloads but can also include specifics and/or additional details related to their context. For example, the captured interaction data can include network parameters such as the source and destination of the interaction, traffic and/or data access patterns, as well as payload parameters such as the database query parameters. Based on the captured interaction, database interactions capture module 207 can also capture configuration changes in connectivity among other properties of the interactions between clients 201 and database server 211. In various embodiments, the captured interactions are stored in captured interactions data store 209 and subsequently utilized for training a data protection machine learning model. The trained model is capable of detecting malicious attacks directed at a disconnected database data structure. The attacks detectable by the trained data protection machine learning model include attacks whose origins are based on network attacks directed against a network-accessible database.

Figure 3:
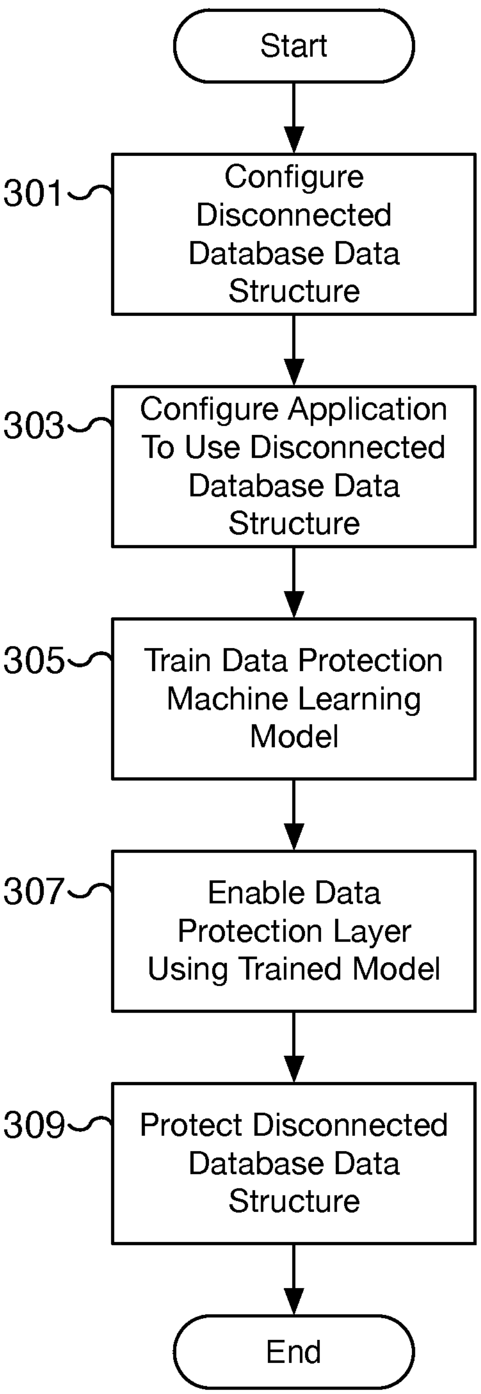
FIG. 3 is a flow chart illustrating an embodiment of a process for providing a protected disconnected database data structure.

FIG. 3 is a flow chart illustrating an embodiment of a process for providing a protected disconnected database data structure. For example, using the process of FIG. 3, a disconnected database data structure that can provide local access to data for local application clients is protected against malicious attacks including attacks from compromised application clients. The application clients are configured to access the disconnected database data structure via an offline interface and the disconnected database data structure is further protected by applying a trained data protection machine learning model to predict and block malicious access. In some embodiments, a data protection layer that supports the offline interface and applies the trained data protection machine learning model is utilized to protect the disconnected database data structure. In some embodiments, the configured application clients are application clients 101 of FIG. 1, the data protection layer is data protection layer 111 of FIG. 1, the offline interface is offline interface 113 of FIG. 1, the trained data protection machine learning model is trained data protection machine learning model 117 of FIG. 1, and/or the disconnected database data structure is disconnected database data structure 121 of FIG. 1. In some embodiments, the trained data protection machine learning model is trained using the configuration of FIG. 2.

At 301, the disconnected database data structure is configured. For example, the disconnected database data structure is configured for use with local applications via an offline interface. In various embodiments, a schema or similar representation for storing the data of the disconnected database data structure is configured and may involve creating tables, defining relationships between tables, and/or identifying data types and constraints for entries into the database data structure. Once the data representation is configured, the disconnected database data structure can be populated with data. For example, the disconnected database data structure can be initially populated with data from an external data source such as from a network-accessible database server. The disconnected database data structure can mirror the external data source but only provide access to the data to local applications. In contrast with remote applications, the local applications are applications that execute locally on the same computing device as the disconnected database data structure. In some embodiments, the disconnected database data structure is configured to synchronize its data with one or more external data sources as configured times.

At 303, an application is configured to use the disconnected database data structure. For example, a local application is configured to access data from the disconnected database data structure by utilizing an offline interface supported by the disconnected database data structure. In some embodiments, the local application is configured to support the offline interface using a provided software development kit (SDK) that allows the local application to function as an application client to the disconnected database data structure. The SDK can provide application support for the offline interface such as via a local application programming interface (API) of the disconnected database data structure.

At 305, a data protection machine learning model is trained. For example, a data protection machine learning model is trained using captured data from online interactions with a network-accessible database. In some embodiments, online interaction data between one or more clients and a database server communicating via a network is captured and used to train a data protection machine learning model to protect an offline database entity such as the disconnected database data structure. In various embodiments, the data protection model can be trained with known malicious attacks against a networked database server as well as with routine and non-malicious database interactions.

At 307, a data protection layer using the trained model is enabled. For example, a data protection layer such as a software data protection wrapper is enabled that monitors all calls made via an offline interface to the disconnected database data structure. The data protection layer includes a prediction engine for applying the data protection machine learning model trained at 305 to detect and block malicious traffic. When enabled, calls via the offline interface are monitored and calls that are identified as malicious are blocked while those that are identified as non-malicious are forwarded to the data protection machine learning model.

At 309, the disconnected database data structure is protected. For example, once the protection layer is enabled with a trained data protection machine learning model, access to the disconnected database data structure is protected by the data protection layer. In various embodiments, once a malicious attack is identified, one or more follow-up actions are performed such as blocking the malicious action. Additional actions such as logging the attack and sending alerts and/or notifications to the appropriate entities such as security personnel and/or automated systems can be performed. In some embodiments, the attack interaction and/or related data entries in the disconnected database data structure can be quarantined. For example, an application client identified as a source for a malicious attack can be quarantined and isolated.

Figure 4:
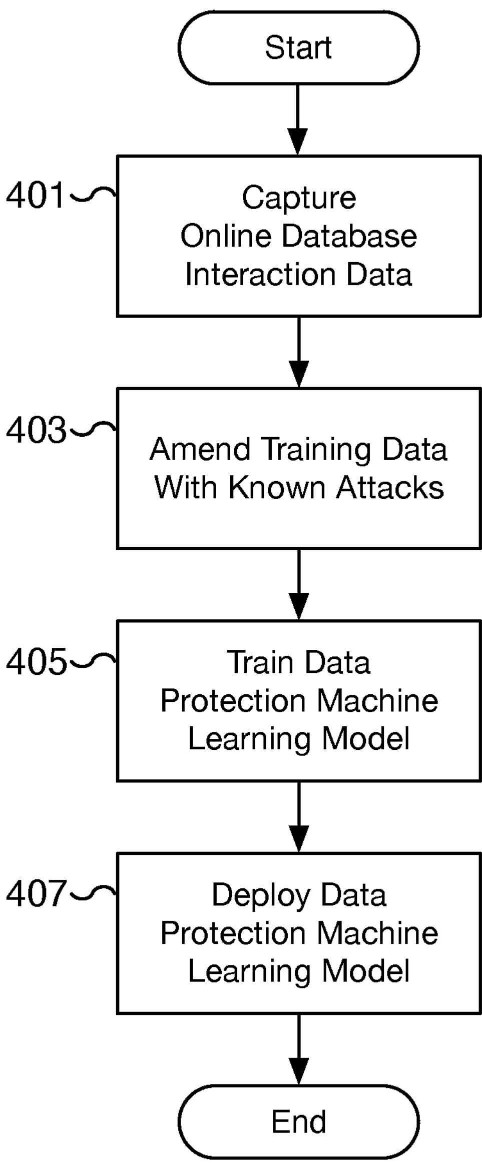
FIG. 4 is a flow chart illustrating an embodiment of a process for training a data protection machine learning model to protect a disconnected database data structure.

FIG. 4 is a flow chart illustrating an embodiment of a process for training a data protection machine learning model to protect a disconnected database data structure. For example, using the process of FIG. 4, a data protection machine learning model is trained using at least online interaction data with a networked database server to identify malicious attacks against an offline database entity such as a disconnected database data structure. In some embodiments, the online interaction data is captured using the configuration of FIG. 2 based on database interactions to a database server such as database server 211 of FIG. 2. In various embodiments, the trained data protection machine learning model is trained data protection machine learning model 117 of FIG. 1 and is used by a data protection layer such as data protection layer 111 of FIG. 1 to protect a disconnected database data structure such as disconnected database data structure 121 of FIG. 1. In some embodiments, the process of FIG. 4 is performed at 305 of FIG. 3.

At 401, online database interaction data is captured. For example, network traffic coming into and exiting from a database server is monitored and captured. The captured traffic can include database queries including structure query language (SQL) or similar data access and/or modification queries/requests. In various embodiments, the captured interactions including metadata related to the interaction such as properties of the parties involved include the application client and its properties as well as the database destination and its properties. Example properties can include the IP address of the application client, the MAC address of the application client, the operating system running on the application client, and/or geographic/location data of the application client, among other properties. In various embodiments, the captured online database interaction data can include payload parameters such as the database query parameters as well as captured traffic patterns and configuration changes in connectivity between clients and the database server. In some embodiments, the interaction data is captured using a database interactions capture module such as database interactions capture module 207 of FIG. 2 and the captured data is stored in a captured interactions data store such as captured interactions data store 209 of FIG. 2.

At 403, the training data is amended with known attacks. For example, the online database interaction data can be amended with additional training data such as data from known malicious attacks including database attacks such as structure query language (SQL) injection, data modification, and/or data theft attacks. Other known malicious attacks can include denial of service attacks, network protocol attacks, software library attacks, operating system call attacks, etc. In various embodiments, the known malicious data set is used to amend clean data sets included in the online database interaction data captured at 401. In some embodiments, the amended training data is selected to model both normal and abnormal behavior.

At 405, a data protection machine learning model is trained. For example, the training data from online interactions captured at 401 and amended with known attacks at 403 is prepared and used to train a data protection machine learning model. As part of training the model, the model is provided with both clean and malicious data. The dataset is prepared with data that represents normal and abnormal behaviors. In some embodiments, the dataset is prepared into training, validation, and testing datasets for training the ML model using supervised learning algorithms. Although supervised training may be preferred, based on the captured online interaction data and related patterns such as identified traffic, location, and/or connectivity patterns, in some embodiments, unsupervised learning algorithms can be applied to train and/or supplement the training of the data protection machine learning model.

At 407, the data protection machine learning model is deployed. For example, the trained data protection machine learning model is deployed to a computer device configured for hosting a disconnected database data structure. In some embodiments, the model is enabled for an associated data protection layer that protects the disconnected database data structure. For example, the data protection layer can include a data protection prediction engine that utilizes the trained data protection machine learning model to predict whether an incoming local call is malicious. In various embodiments, once the trained model is deployed, one or more tests are run against model predictions to confirm its accuracy.

Figure 5:
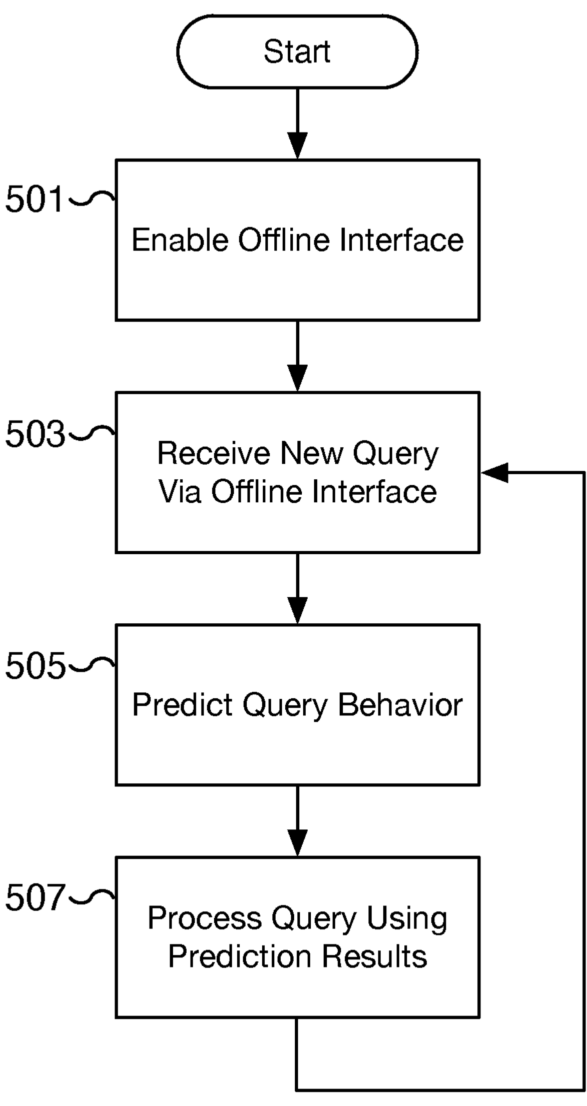
FIG. 5 is a flow chart illustrating an embodiment of a process for protecting a disconnected database data structure using a data protection layer configured with a trained data protection machine learning model.

FIG. 5 is a flow chart illustrating an embodiment of a process for protecting a disconnected database data structure using a data protection layer configured with a trained data protection machine learning model. For example, using the process of FIG. 5, a trained data protection machine learning model is deployed to identify malicious attacks against an offline database entity such as a disconnected database data structure. In some embodiments, the process of FIG. 5 is performed by components of computing device 100 of FIG. 1 including data protection layer 111 of FIG. 1 and data protection prediction engine 115 of FIG. 1 using trained data protection machine learning model 117 of FIG. 1. In some embodiments, the protected disconnected database data structure is disconnected database data structure 121 of FIG. 1 and its data is made accessible via an offline interface such as offline interface 113 of FIG. 1. In some embodiments, the process of FIG. 5 is performed at 307 and/or 309 of FIG. 3.

At 501, an offline interface for accessing the disconnected database data structure is enabled. For example, a local application programming interface (API) is enabled for accessing data of the disconnected database data structure. The offline interface is configured to only allow local calls such as calls made from an application client running on the same computing device as the disconnected database data structure. In some embodiments, the offline interface is implemented using a data protection layer that accepts the incoming local call before determining whether the call is malicious and should be blocked or is non-malicious and should be forwarded to the disconnected database data structure for processing.

At 503, a new query is received via the offline interface. For example, a new local call is received at the offline interface. The new call can conform to an established interface exposed via an application programming interface (API) and application support can be provided via a software development kit (SDK). In various embodiments, as part of receiving the new local offline query, the interaction is processed to extract certain parameters. For example, properties of the source for the query can be extracted such as the source location including geolocation, source IP address, source operating system, source application name and version, etc. Payload properties can be extracted as well such as a database data structure query, the targeted data of the query, etc. Additionally, the query can be put in the context of other queries such as one of a pattern of related queries based on properties such as time frame, source location, target data fields, etc. In various embodiments, the extracted properties can be utilized as features of the query when performing an inference prediction at 505.

At 505, the query behavior is predicted. For example, the trained data protection machine learning model is applied to properties of the query received at 503. In some embodiments, the properties correspond to different features of the query as extracted at 503, such as properties of the source and/or destination, the query syntax, related patterns in the context of other queries, etc. In various embodiments, the prediction results from applying inference to the query correspond to identifying the expected behavior of the query including whether the query is a malicious query and/or part of a malicious attack on the disconnected database data structure or alternatively whether the expected query behavior is non-malicious.

At 507, the query is processed using the prediction results. For example, the query received at 503 via the offline interface is processed based on the results determined at 505 from applying the trained data protection machine learning model. In the event a malicious query is identified at 505, at 507, the malicious query can be blocked and other responsive actions can be performed. Example responses to identifying a malicious query include sending alerts and/or notifications, quarantining the application client, and/or modifying access controls and/or permissions to the disconnected database data structure, among others. In the event the query is identified as non-malicious at 505, at 507, the query can be forwarded to the disconnected database data structure for processing the query. For example, the query can be used to retrieve, modify, add, and/or perform one or more other data processing actions on the data of the disconnected database data structure.

In various embodiments, the process of FIG. 5 is continuously performed and after each query is received and processed, the next pending query can be received and similarly processed. In some embodiments, multiple queries can be processed in parallel although for simplicity, the process of FIG. 5 is shown applied to a single query instance at a time. As shown in FIG. 5, after the step of 507 is performed, processing loops back to step 503 where a new query can be received and subsequently processed in order to protect the disconnected database data structure from malicious attacks. In various embodiments, in the event the offline interface is disabled (not shown), the process of FIG. 5 will end.

Figure 6:
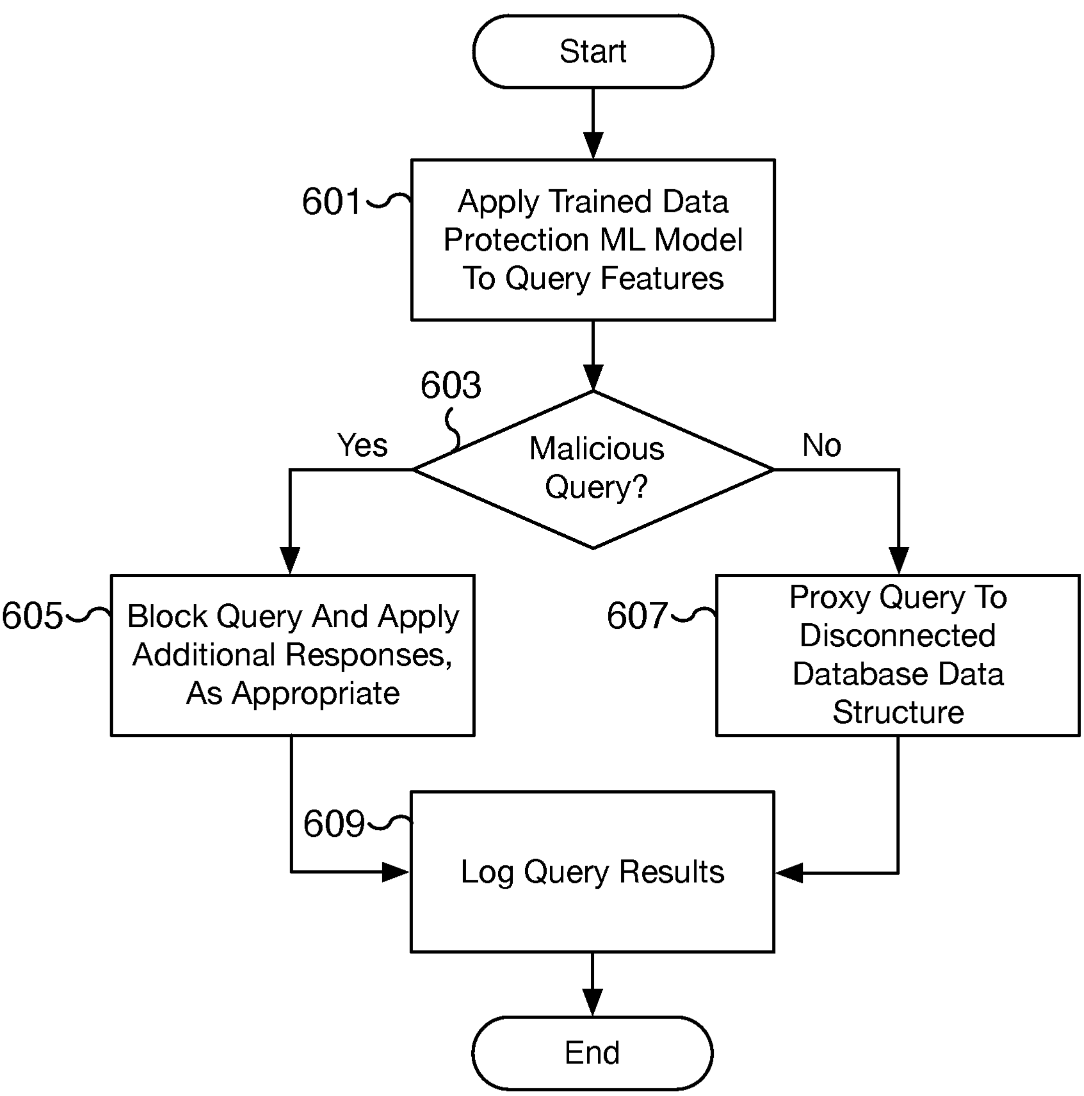
FIG. 6 is a flow chart illustrating an embodiment of a process for processing an offline interaction for a disconnected database data structure to prevent malicious attacks.

FIG. 6 is a flow chart illustrating an embodiment of a process for processing an offline interaction for a disconnected database data structure to prevent malicious attacks. For example, using the process of FIG. 6, a trained data protection machine learning model is applied by a data protection layer to predict whether an incoming query for a disconnected database data structure is malicious or non-malicious, and based on the determination the appropriate response is applied. In some embodiments, the data protection layer is data protection layer 111 of FIG. 1, the trained data protection machine learning model is trained data protection machine learning model 117 of FIG. 1, and the protected disconnected database data structure is disconnected database data structure 121 of FIG. 1. In some embodiments, the process of FIG. 6 is performed at 307 and/or 309 of FIG. 3 and/or at 505 and/or 507 of FIG. 5.

At 601, a trained data protection machine learning model is applied to features of a query to predict whether the query is malicious. For example, features of the query such as features based on the properties of the source and/or destination, the query syntax, related patterns in the context of other queries including location context and time context, changes in connectivity, etc. are used to infer whether the query's expected behavior is malicious. In various embodiments, predicted malicious behavior can include a variety of malicious attacks such as structure query language (SQL) injection attacks, denial-of-service (DOS) attacks, data modification attacks, and/or data theft attacks, among others.

At 603, a determination is made whether the query is a malicious query. For example, based on the application of the trained data protection machine learning model, a prediction result is used to determine whether the query is a malicious query. In the event the query is a malicious query, processing proceeds to 605. In the event the query is a non-malicious query, processing proceeds to 607.

At 605, the query is blocked and additional responses, as appropriate, are applied. For example, a query determined as malicious at 603 is blocked and the local call associated with the query is prevented from accessing the data of the disconnected database data structure. In various embodiments, for example, based on configuration settings, additional responses including follow-up responses and/or counter measures to a malicious query are performed. For example, alerts and/or notifications can be sent to the appropriate entities such as security personnel and/or automated systems. In some embodiments, the query, data and related data in the disconnected database data structure referenced by the query, the application client sending the query, and/or other related groupings such as groupings of clients, queries, and/or data, etc. can be quarantined. For example, an application client identified as a source for a malicious attack can be quarantined and isolated. Similarly, application clients related to the identified malicious client such as clients from the vendor or associated with the same account, user, and/or user memory space can be quarantined and isolated. In some embodiments, the data the query is attempting to access can be isolated and/or access to the requested data can be made to require additional qualifications including additional security measures. In various embodiments, the additional responses can be configured and can include multiple different levels of responses as appropriate.

At 607, the query is proxied to the disconnected database data structure. For example, a query determined as non-malicious at 603 is forwarded to the disconnected database data structure for processing the query. The forwarded query can be used to retrieve, modify, add, and/or perform one or more other data processing and/or database data structure actions on the disconnected database data structure and its data. The non-malicious query is allowed to access the data under the control of the disconnected database data structure with little to no interruption.

At 609, the query results are logged. For example, the results from processing both malicious and non-malicious queries can be optionally logged. In some embodiments, the logging is used for performing analytics such as access analytics on the disconnected database data structure. For example, the logged results can be used to extract access patterns to the disconnected database data structure and its data and can be further used to help differentiate normal behavior from abnormal and/or anomalous behavior. In some embodiments, the logged data including logged interactions are used as training data for subsequent versions of the data protection machine learning model.

Figure 7:
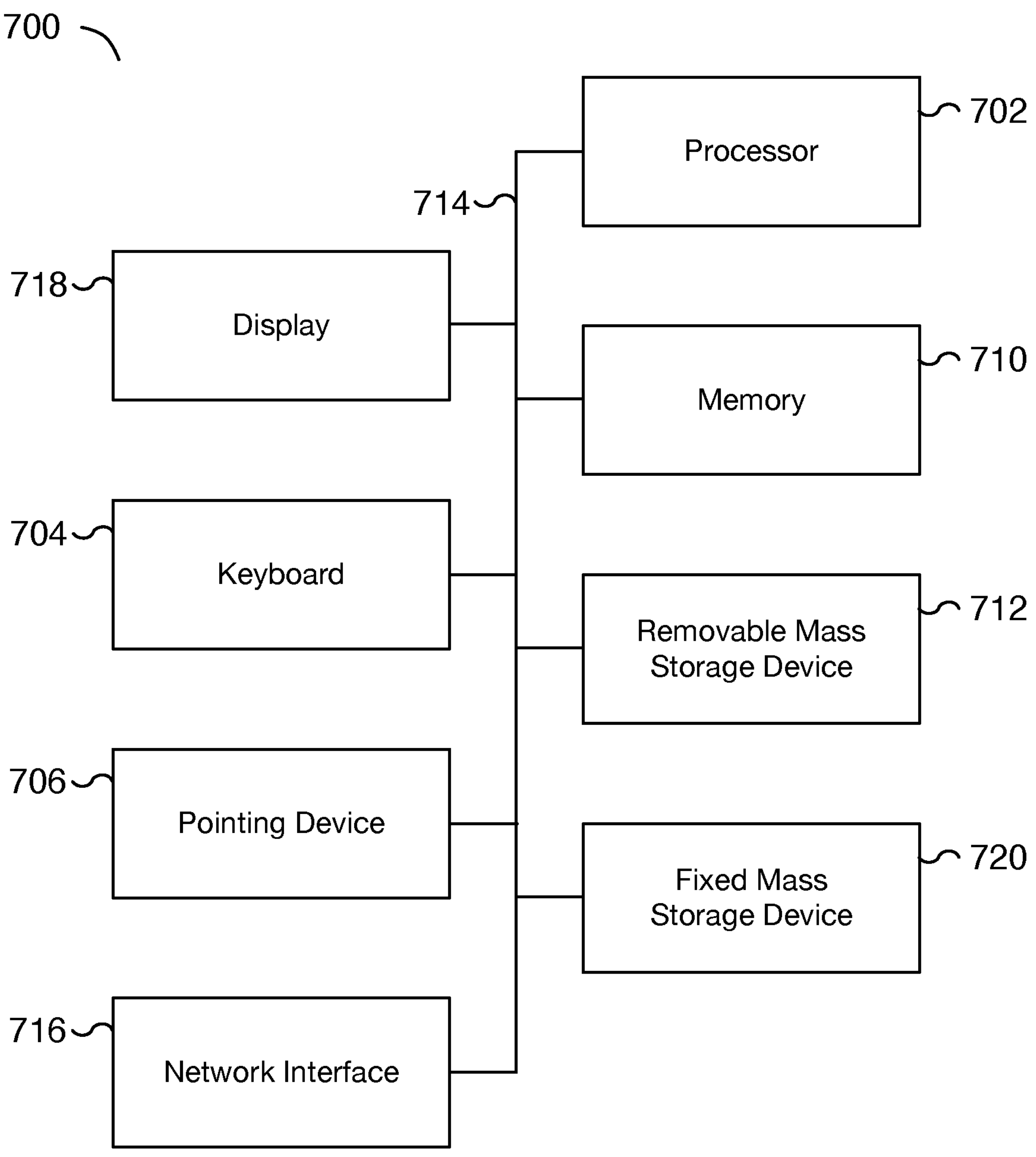
FIG. 7 is a functional diagram illustrating a programmed computer system for providing a protected disconnected database data structure.

FIG. 7 is a functional diagram illustrating a programmed computer system for providing a protected disconnected database data structure. As will be apparent, other computer system architectures and configurations can be utilized for protecting a disconnected database data structure using a trained data protection machine learning model. Examples of computer system 700 include computer device 100 of FIG. 1 and/or one or more computers of clients 201 of FIG. 2, of database interactions capture module 207 of FIG. 2, of captured interactions data store 209 of FIG. 2, and/or of database server 211 of FIG. 2. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In various embodiments, one or more instances of computer system 700 can be used to implement at least portions of the processes of FIGS. 3-6.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data and objects used by the processor 702 to perform its functions (e.g., programmed instructions). For example, memory 710 can include any suitable computer-readable storage media, described below, depending on whether, for example, data access needs to be bi-directional or unidirectional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or unidirectionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, by way of an offline interface provided as part of a disconnected database in an offline mode, a plurality of local calls from one or more application clients, wherein the offline interface, the disconnected database, and the application clients are executing on a same computing device;

generating, via a data protection machine learning model trained using at least online interaction data captured from a network-accessible database, predictions regarding the plurality of local calls, wherein the data protection machine learning model has been trained to predict whether a call is a malicious call or a non-malicious call; and based on the predictions from the data protection machine learning model, blocking a local call of the plurality of local calls that is predicted to be malicious from accessing the disconnected database, and allowing a local call of the plurality of local calls that is predicted to be non-malicious to access the disconnected database, wherein blocking the local call that is predicted to be malicious from accessing the disconnected database comprises quarantining an application client associated with the local call.

2. The method of claim 1, wherein the data protection machine learning model has been trained to predict whether calls to offline interface are malicious calls or non-malicious calls using known malicious attacks.

3. The method of claim 1, wherein the data protection machine learning model has been trained to predict whether calls to offline interface are malicious calls or non-malicious calls using interactions corresponding to structure query language (SQL) injection attacks, denial-of-service (DOS) attacks, data modification attacks, or data theft attacks.

4. The method of claim 1, wherein the disconnected database initially includes data from a network-accessible database server.

5. The method of claim 1, wherein the offline interface comprises an application programming interface (API) accessible only to applications executing on the same computing device as the disconnected database.

6. The method of claim 1, wherein application support for the offline interface is provided via a software development kit (SDK).

7. A system comprising:

one or more processors; and a memory coupled to the one or more processors, wherein the memory is configured to provide the one or more processors with instructions which when executed cause the one or more processors to:

receive, by way of an offline interface provided as part of a disconnected database in an offline mode, a plurality of local calls from one or more application clients, wherein the offline interface, the disconnected database and the application clients are executing on a same computing device;

generate, via a data protection machine learning model trained using at least online interaction data captured from a network-accessible database, predictions regarding the plurality of local calls, wherein the data protection machine learning model has been trained to predict whether a call is a malicious call or a non-malicious call; and based on the predictions from the data protection machine learning model, block a local call of the plurality of local calls that is predicted to be malicious from accessing the disconnected database, and allowing a local call of the plurality of local calls that is predicted to be non-malicious to access the disconnected database, wherein blocking the local call that is predicted to be malicious from accessing the disconnected database comprises quarantining an application client associated with the local call.

8. The system of claim 7, wherein the data protection machine learning model has been trained to predict whether calls to the offline interface are malicious calls or non-malicious calls using known malicious attacks.

9. The system of claim 7, wherein the data protection machine learning model has been trained to predict whether calls to the offline interface are malicious calls or non-malicious calls using interactions corresponding to structure query language (SQL) injection attacks, denial-of-service (DOS) attacks, data modification attacks, or data theft attacks.

10. The system of claim 7, wherein the disconnected database initially includes data from a network-accessible database server.

11. The system of claim 7, wherein the offline interface comprises an application programming interface (API) accessible only to applications executing on the same computing device as the disconnected database.

12. A computer program product, the computer program product being embodied in a non-transitory computer readable storage medium and comprising computer instructions for:

receiving, by way of an offline interface provided as part of a disconnected database in an offline mode, a plurality of local calls from one or more application clients, wherein the offline interface, the disconnected database, and the application clients are running on a same computing device;

generating, via a data protection machine learning model trained using at least online interaction data captured from a network-accessible database, predictions regarding the plurality of local calls, wherein the data protection machine learning model has been trained to predict whether a call is a malicious call or a non-malicious call; and based on the predictions from the data protection machine learning model, blocking a local call of the plurality of local calls that is predicted to be malicious from accessing the disconnected database, and allowing a local call of the plurality of local calls that is predicted to be non-malicious to access the disconnected database, wherein blocking the local call that is predicted to be malicious from accessing the disconnected database comprises quarantining an application client associated with the local call.

13. The method of claim 1, wherein the online interaction data are based at least in part on a source property, a location context, a time context, one or more targeted data fields, or changes in connectivity.

14. The method of claim 1, wherein using the online interaction data to train the data protection machine learning model includes extracting machine learning features from the online interaction data, wherein the machine learning features correspond to one or more source properties of the online interaction data, one or more destination properties of the online interaction data, or one or more database queries of the online interaction data.

15. The method of claim 1, wherein the online interaction data includes anomalous database interaction behavior.

16. The system of claim 7, wherein the online interaction data are based at least in part on a source property, a location context, a time context, one or more targeted data fields, or changes in connectivity.

17. The system of claim 7, wherein using the online interaction data to train the data protection machine learning model includes extracting machine learning features from the online interaction data, wherein the machine learning features correspond to one or more source properties of the online interaction data, one or more destination properties of the online interaction data, or one or more database queries of the online interaction data.

18. The system of claim 7, wherein the online interaction data includes anomalous database interaction behavior.

19. The method of claim 1, wherein the disconnected database is a copy of the network-accessible database.

20. The method of claim 1, wherein the disconnected database is a version of the network-accessible database.

21. The method of claim 1, wherein the disconnected database in the offline mode cannot be accessed via a network operation.

* * * * *